(12) United States Patent
Assouline et al.

(10) Patent No.: US 12,062,146 B2
(45) Date of Patent: Aug. 13, 2024

(54) VIRTUAL WARDROBE AR EXPERIENCE

(71) Applicant: Snap Inc., Santa Monica, CA (US)

(72) Inventors: Avihay Assouline, Tel Aviv (IL); Itamar Berger, Hod Hasharon (IL); Gal Dudovitch, Tel Aviv (IL); Peleg Harel, Ramat Gan (IL); Ma'ayan Mishin Shuvi, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 98 days.

(21) Appl. No.: 17/815,831

(22) Filed: Jul. 28, 2022

(65) Prior Publication Data
US 2024/0037858 A1 Feb. 1, 2024

(51) Int. Cl.
*G06T 19/00* (2011.01)
*G06N 3/082* (2023.01)
*G06Q 30/0601* (2023.01)

(52) U.S. Cl.
CPC ........... *G06T 19/006* (2013.01); *G06N 3/082* (2013.01); *G06Q 30/0643* (2013.01); *G06T 2200/08* (2013.01); *G06T 2200/24* (2013.01); *G06T 2210/16* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 5,604,843 A | 2/1997 | Shaw et al. | |
| 5,689,559 A | 11/1997 | Park | |
| 5,880,731 A | 3/1999 | Liles et al. | |
| 5,930,769 A | 7/1999 | Rose | |
| 6,023,270 A | 2/2000 | Brush, II et al. | |
| RE36,919 E | 10/2000 | Park | |
| RE37,052 E | 2/2001 | Park | |
| 6,223,165 B1 | 4/2001 | Lauffer | |

(Continued)

FOREIGN PATENT DOCUMENTS

| CN | 109863532 A | 6/2019 |
|---|---|---|
| CN | 110168478 A | 8/2019 |

(Continued)

OTHER PUBLICATIONS

"3D Scanning Services—Konica Minolta 3D Scanning Labs", [Online]. Retrieved from the Internet: <URL: http://sensing.konicaminolta.us/search-by-services/3d-scanning-services/>, (Accessed Feb. 15, 2013), 2 pgs.

(Continued)

*Primary Examiner* — Jason A Pringle-Parker
(74) *Attorney, Agent, or Firm* — Schwegman Lundberg & Woessner, P.A.

(57) ABSTRACT

Aspects of the present disclosure involve a system for providing AR experiences. The system accesses, by a messaging application, an image depicting a real-world fashion item of a user and generates a three-dimensional (3D) virtual fashion item based on the real-world fashion item depicted in the image. The system stores the 3D virtual fashion item in a database that includes a virtual wardrobe comprising a plurality of 3D virtual fashion items associated with the user. The system generates, by the messaging application, an augmented reality (AR) experience that allows the user to interact with the virtual wardrobe.

20 Claims, 12 Drawing Sheets

(56) References Cited

U.S. PATENT DOCUMENTS

| | | |
|---|---|---|
| 6,546,309 B1 | 4/2003 | Gazzuolo |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 6,901,379 B1 | 5/2005 | Balter et al. |
| 7,062,454 B1 | 6/2006 | Giannini et al. |
| 7,328,177 B1 | 2/2008 | Lin-Hendel |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,256,664 B1 | 9/2012 | Balfanz et al. |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| 8,401,914 B1 | 3/2013 | Kim |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,700,392 B1 | 4/2014 | Hart et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,064,184 B2 | 6/2015 | Ruan |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,589,535 B2 | 3/2017 | Poon et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,724,600 B2 | 8/2017 | Willoughby et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,799,064 B2 | 10/2017 | Ohnemus et al. |
| 9,839,844 B2 | 12/2017 | Dunstan et al. |
| 9,883,838 B2 | 2/2018 | Kaleal, III et al. |
| 9,898,742 B2 | 2/2018 | Higgins et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,311,508 B2 | 6/2019 | Reed et al. |
| 10,332,176 B2 | 6/2019 | Gadre et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,529,009 B2 | 1/2020 | Gadre et al. |
| 10,540,757 B1 * | 1/2020 | Bouhnik ............... G06T 3/14 |
| 10,573,048 B2 | 2/2020 | Ni et al. |
| 10,653,962 B2 | 5/2020 | Gadre et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,776,981 B1 * | 9/2020 | Gorbatyuk ............ G06T 7/20 |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |

(56) References Cited

U.S. PATENT DOCUMENTS

| | | |
|---|---|---|
| 11,270,491 B2 | 3/2022 | Monroy-Hernández et al. |
| 11,284,144 B2 | 3/2022 | Kotsopoulos et al. |
| 2002/0045959 A1 | 4/2002 | Van Overveld |
| 2002/0067362 A1 | 6/2002 | Agostino Nocera et al. |
| 2002/0169644 A1 | 11/2002 | Greene |
| 2002/0178061 A1 | 11/2002 | Lam |
| 2005/0086126 A1 | 4/2005 | Patterson |
| 2005/0162419 A1 | 7/2005 | Kim et al. |
| 2005/0206610 A1 | 9/2005 | Cordelli |
| 2005/0246278 A1 | 11/2005 | Gerber et al. |
| 2005/0275638 A1 | 12/2005 | Kolmykov-zotov et al. |
| 2006/0184993 A1 | 8/2006 | Goldthwaite et al. |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0198120 A1 | 8/2007 | Wannier et al. |
| 2008/0004116 A1 | 1/2008 | Van Luchene et al. |
| 2008/0158222 A1 | 7/2008 | Li et al. |
| 2009/0016617 A1 | 1/2009 | Bregman-amitai et al. |
| 2009/0018926 A1 | 1/2009 | Buehlman |
| 2009/0019053 A1 | 1/2009 | Burgess et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0115777 A1 | 5/2009 | Reyers Moreno |
| 2009/0157479 A1* | 6/2009 | Caldwell ............ G06Q 30/0631 |
| | | 705/26.7 |
| 2009/0158170 A1 | 6/2009 | Narayanan et al. |
| 2009/0167719 A1 | 7/2009 | Woolley |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0030578 A1* | 2/2010 | Siddique ................ H04W 4/00 |
| | | 705/26.1 |
| 2010/0034462 A1 | 2/2010 | Nevatia et al. |
| 2010/0115426 A1 | 5/2010 | Liu et al. |
| 2010/0162149 A1 | 6/2010 | Sheleheda et al. |
| 2010/0191770 A1 | 7/2010 | Cho et al. |
| 2010/0203968 A1 | 8/2010 | Gill et al. |
| 2010/0217685 A1 | 8/2010 | Melcher et al. |
| 2010/0227682 A1 | 9/2010 | Reville et al. |
| 2010/0245555 A1 | 9/2010 | Talluri et al. |
| 2010/0306082 A1 | 12/2010 | Wolper et al. |
| 2011/0078055 A1 | 3/2011 | Faribault et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0246329 A1 | 10/2011 | Geisner et al. |
| 2012/0022978 A1 | 1/2012 | Manea et al. |
| 2012/0086783 A1 | 4/2012 | Sareen et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0137259 A1 | 5/2012 | Campbell et al. |
| 2012/0162218 A1 | 6/2012 | Kim et al. |
| 2012/0239513 A1 | 9/2012 | Oliver et al. |
| 2012/0257035 A1 | 10/2012 | Larsen |
| 2012/0299912 A1 | 11/2012 | Kapur et al. |
| 2013/0030915 A1 | 1/2013 | Statler et al. |
| 2013/0103760 A1 | 4/2013 | Golding et al. |
| 2013/0110679 A1 | 5/2013 | Spadafora et al. |
| 2013/0166407 A1 | 6/2013 | Sullaj |
| 2013/0179288 A1 | 7/2013 | Moses et al. |
| 2013/0185679 A1 | 7/2013 | Fretwell et al. |
| 2013/0201187 A1 | 8/2013 | Tong et al. |
| 2013/0215116 A1 | 8/2013 | Siddique et al. |
| 2013/0249948 A1 | 9/2013 | Reitan |
| 2013/0254066 A1 | 9/2013 | Amacker et al. |
| 2013/0257877 A1 | 10/2013 | Davis |
| 2013/0304578 A1 | 11/2013 | Kannan et al. |
| 2014/0040041 A1 | 2/2014 | Ohnemus |
| 2014/0043329 A1 | 2/2014 | Wang et al. |
| 2014/0052567 A1 | 2/2014 | Bhardwaj et al. |
| 2014/0055554 A1 | 2/2014 | Du et al. |
| 2014/0115059 A1 | 4/2014 | Van Wie et al. |
| 2014/0125678 A1 | 5/2014 | Wang et al. |
| 2014/0129343 A1 | 5/2014 | Finster et al. |
| 2014/0132635 A1 | 5/2014 | Murdoch et al. |
| 2014/0176565 A1 | 6/2014 | Adeyoola et al. |
| 2014/0180873 A1 | 6/2014 | Rijhwani |
| 2014/0225978 A1 | 8/2014 | Saban et al. |
| 2014/0279192 A1 | 9/2014 | Selby |
| 2014/0285522 A1 | 9/2014 | Kim et al. |
| 2014/0330670 A1 | 11/2014 | Ainsworth, III et al. |
| 2014/0358738 A1 | 12/2014 | Ohnemus et al. |
| 2014/0368499 A1 | 12/2014 | Kaur |
| 2015/0058083 A1 | 2/2015 | Herrero |
| 2015/0154691 A1* | 6/2015 | Curry ................ G06Q 30/0631 |
| | | 705/27.2 |
| 2015/0206349 A1 | 7/2015 | Rosenthal et al. |
| 2015/0379623 A1 | 12/2015 | Gadre et al. |
| 2016/0027088 A1* | 1/2016 | Jensen ............... G06Q 30/0631 |
| | | 705/26.7 |
| 2016/0042402 A1 | 2/2016 | Gadre et al. |
| 2016/0063588 A1 | 3/2016 | Gadre et al. |
| 2016/0063613 A1 | 3/2016 | Zhao et al. |
| 2016/0134840 A1 | 5/2016 | Mcculloch |
| 2016/0234149 A1 | 8/2016 | Tsuda et al. |
| 2017/0011452 A1* | 1/2017 | Beckham ............. G06Q 20/204 |
| 2017/0076011 A1* | 3/2017 | Gannon ............. G06F 16/5866 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0005375 A1* | 1/2018 | Krimon ................ G06Q 10/087 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0137515 A1 | 5/2018 | Higgins et al. |
| 2018/0198743 A1 | 7/2018 | Blackstock et al. |
| 2018/0308149 A1* | 10/2018 | Guo ..................... G06N 3/045 |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0266654 A1 | 8/2019 | Gadre et al. |
| 2019/0272675 A1* | 9/2019 | Wagner .................. H04N 23/57 |
| 2019/0280997 A1 | 9/2019 | Baldwin et al. |
| 2020/0306637 A1 | 10/2020 | Baldwin et al. |
| 2020/0320769 A1* | 10/2020 | Chen .................... G06F 18/214 |
| 2020/0372127 A1 | 11/2020 | Denton et al. |
| 2020/0402307 A1 | 12/2020 | Tanwer et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0287274 A1 | 9/2021 | Nguyen et al. |
| 2021/0306290 A1 | 9/2021 | Voss |
| 2021/0306451 A1 | 9/2021 | Heikkinen et al. |

(56) References Cited

U.S. PATENT DOCUMENTS

| | | |
|---|---|---|
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0189087 A1 | 6/2022 | Shuvi et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2015200617 A1 | 12/2015 |
| WO | WO-2016019033 A2 | 2/2016 |
| WO | WO-2016019033 A3 | 2/2016 |
| WO | WO-2016022937 A1 | 2/2016 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | 2024025830 | 2/2024 |

OTHER PUBLICATIONS

"A Brief Overview of Gesture Recognition", This page is maintained by Charles Cohen and sponsored by Cybernet Systems Corporation, [Online]. Retrieved from the Internet: <URL: http://homepages.inf.ed.ac.uk/rbf/CVonline/LOCAL_COPIES/COHEN/gesture_o>, (Accessed Feb. 14, 2013), 17 pgs.

"About Fits.me—Virtual Fitting Room", [Online]. Retrieved from the Internet: <URL: http://fits.me/about/about-fits-me/>, (Accessed May 27, 2014), 5 pgs.

"Augmented Reality Virtual Fitting Room", Retrieved from the Internet URL: <https://www.youtube.com/watch?v=F-3qC4q8toU>, (Feb. 12, 2012), 2 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Fitnect", Fitnect Interactive, [Online]. Retrieved from the Internet: <URL: http://www.fitnect.hu/>, (Accessed May 27, 2014), 2 pgs.

"Gesture Design Blog: Gestural Intent", [Online]. Retrieved from the Internet: <URL: http://gesturedesignblog.com/?page_id=63>, (Mar. 15, 2010), 4 pgs.

"Gesture recognition—Wikipedia, the free encyclopedia", [Online]. Retrieved from the Internet: <URL: http://en.wikipedia.org/wiki/Gesture_recognition>, (Accessed Feb. 15, 2013), 6 pgs.

"Gesture Technology Virtual Dressing rooms !! Punitatannas Blog", [Online]. Retrieved from the Internet: <URL: http://punitatanna.wordpress.com/2010/08/31/gesture-technology-virtual-dressing-rooms/>, (Aug. 31, 2010), 5 pgs.

"Gestures control true 3D display", [Online]. Retrieved from the Internet: <URL: Info collage around internet: Gestures control true 3D display>, (Dec. 29, 2004), 2 pgs.

"GestureTek", GestureTeck Inc. is Purchased Back by Co-Founder Vincent John Vincent, [Online]. Retrieved from the Internet: <URL: http://www.gesturetek.com/>, (Accessed Feb. 15, 2013), 1 pg.

"Get Your Converse Shoes On Virtually Using Augmented Reality", 2012 Digital Analog An Online Publication for Creativity Code, [Online]. Retrieved from the Internet: <URL: http://digitalanalog.in/2011/03/14/get-your-converse-shoes-on-virtually-using-augmented-reality/>, (Mar. 14, 2011), 7 pgs.

"HowStuffWorks: Electronics", [Online]. Retrieved from the Internet: <URL: http://electronics.howstuffworks.com/>, (Accessed Feb. 14, 2013), 2 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Kinect—Virtual Dressing Room", X-Tech Blog, (Feb. 3, 2014), 5 pgs.

"Kinect—Wikipedia, the free encyclopedia", (Accessed Feb. 15, 2013), 16 pgs.

"Kinect Body Scanning—Body Scanning Reinvented", [Online]. Retrieved from the Internet: <URL: http://www.styku.com/business/benefits/bodyscanning/>, (Accessed Feb. 15, 2013), 2 pgs.

"Kinect_calibration/technical—ROS Wiki", [Online]. Retrieved from the Internet: <URL: http://www.ros.org/wiki/kinect_calibration/technical>, (Accessed Feb. 15, 2013), 8 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Metail: translating cutting edge research into commercial success", [Online]. Retrieved from the Internet: <URL: http://www.eng.cam.ac.uk/news/stories/2012/Me_tail/>, (Mar. 15, 2012), 5 pgs.

"My Style Rules—The way you were meant to dress", [Online]. Retrieved from the Internet: <URL: http://mystylerules.com/>, (Accessed Feb. 15, 2013), 1 pg.

"Online clothes-shopping: is an avatar the answer?", The Guardian, [Online]. Retrieved from the Internet: <URL: http://www.theguardian.com/fashion/shortcuts/2012/feb/29/online-clothes-shopping-avatar>, (Accessed May 27, 2014), 4 pgs.

"Online Fitting Room Shopping Augmented Reality", Retrieved from the Internet URL: <https://www.youtube.com/watch?v=OHAyOtlugtY>, (Apr. 29, 2011), 2 pgs.

"SketchUp—How To Information | eHow.com", [Online]. Retrieved from the Internet: <URL: http://www.ehow.com/sketchup/>, (Accessed Feb. 15, 2013), 27 pgs.

"Skyrim Kinect—YouTube", [Online]. Retrieved from the Internet: <URL: http://www.youtube.com/watch?v=Z83wzJwrBK0>, (Accessed Feb. 14, 2012), 2 pgs.

"The Future Of Shopping Is Here", [Online]. Retrieved from the Internet: <URL: http://www.simplyzesty.com/advertising-and-marketing/the-future-of-shopping-is-here-video/>, (Jun. 12, 2012), 9 pgs.

"Top 10 Best Kinect Hacks", [Online]. Retrieved from the Internet: <URL: http://www.kinecthacks.com/top-10-best-kinect-hacks>, (Accessed Feb. 15, 2013), 6 pgs.

"Trying on Shoes Made Easy at the Adidas Shop in Paris", [Online]. Retrieved from the Internet: <URL: http://www.geeksugar.com/Trying-Shoes-Made-Easy-Adidas-Shop-Paris-159420>, (Mar. 6, 2007), 5 pgs.

"Using A Clinometer To Measure Height", http://www.instructables.com/id/Using-a-clinometer-to-measure-height/, (Apr. 23, 2013), 16 pgs.

"Virtual Dressing Room", Wikipedia, the free encyclopedia, [Online]. Retrieved from the Internet: <URL: http://en.wikipedia.org/wiki/Virtual_dressing_room>, (Accessed May 27, 2014), 6 pgs.

(56) References Cited

OTHER PUBLICATIONS

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Andrew, et al., "Robust High-Resolution Cloth Using Parallelism, History-Based Collisions and Accurate Friction", IEEE Transactions on Visualization and Computer Graphics, vol. 15, No. 2, 2009, (Mar.-Apr. 2009), 339-350.
Baudel, Thomas, et al., "CHARADE: Remote Control of Objects using Free-Hand Gestures", [Online]. Retrieved from the Internet: <URL: http://thomas.baudel.name/Morphologie/cacm.html>, (Accessed Feb. 15, 2013), 9 pgs.
Billinghurst, Mark, et al., "Chapter 14: Gesture Based Interaction", [Online]. Retrieved from the Internet: <URL: http://www.billbuxton.com/input14.Gesture.pdf >, (Aug. 24, 2011), 35 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Cordier, Frederic, et al., "Made-to-Measure Technologies for Online Clothing Store", [Online]. Retrieved from the Internet: <URL: http://www.miralab.ch/repository/papers/25.pdf>, (Accessed Feb. 15, 2013), 12 pgs.
Crawford, Stephanie, "HowStuffWorks: How Microsoft Kinect Works", [Online]. Retrieved from the Internet: <URL: http://electronics.howstuffworks.com/microsoft-kinect.htm>, (Accessed Feb. 14, 2013), 2 pgs.
Daly, Erica, "This is the Year of the Virtual Fit Assistant | Techli", [Online]. Retrieved from the Internet: <URL: http://techli.com/2011/11/year-of-virtual-fit-assistant/>, (Nov. 16, 2011), 3 pgs.
Higgins, Krystal, "Designing Kinect-Based Experiences", [Online]. Retrieved from the Internet: <URL: http://www.kryshiggins.com/thoughts-on-designing-kinect-based-experiences/>, (Apr. 4, 2011), 12 pgs.
Horsey, Julian, "Augmented Reality App Allows You To Try Clothes Before You Buy In A Virtual Dressing Room video", [Online]. Retrieved from the Internet: <http://www.geeky-gadgets.com/augmented-reality-app-allows-yout-to-try-clothes-before-you-buy-in-a-virtual-dressing-room>, (Sep. 29, 2010), 9 pgs.
Yu, Hui, et al., "On generating realistic avatars: dress in your own style", Multimedia Tools and Applications, 59(3); DOI:10.1007/s11042-011-0781-6, (2012), 973-990.
Hunter, Seth, et al., "WordPlay: A Table-Top Interface for Collaborative Brainstorming and Decision Making", Proceedings of IEEE Tabletops and Interactive Surfaces, 2008, [Online]. Retrieved from the Internet: <URL: http://fluid.media.mit.edu/sites/default/files/WordPlayFinalIEEE_AffiliationIncluded.pdf>, (2008), 4 pgs.
Kimbrel, Heather, "How to Create a Virtual Model of My Body Measurements | eHow.com", [Online]. Retrieved from the Internet: <URL: http://www.ehow.com/how_6817795_create-virtual-model-body-measurements.html>; (Accessed Feb. 15, 2013), 3 pgs.
Li, Rong, et al., "Research of Interactive 3D Virtual Fitting Room on Web Environment", ISCID Proceedings of the 2011 Fourth International Symposium on Computational Intelligence and Design—vol. 01, [Online]. Retrieved from the Internet: <URL: http://ieeexplore.ieee.org/xpl/articleDetails.jsp?reload=true&arnumber=6079627&contentType=Conference+Publications>, (2011), 32-35.
MacCormick, John, "How does the Kinect work?", [Online]. Retrieved from the Internet: <URL: http://users.dickinson.edu/~jmac/selected-talks/kinect.pdf>, (Accessed Feb. 15, 2013), 52 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newitz, Annalee, "10 physical gestures that have been patented", (Jun. 6, 2011), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Nickinson, Phil, "Front-facing cameras mean hand-free gesture commands for Android", [Online]. Retrieved from the Internet: <URL: http://www.androidcentral.com/front-facing-cameras-mean-hands-free-gesture-co . . . >, (Accessed Feb. 14, 2013), 6 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Pierrepont, Nathalie, "Amongst Promises of a Perfect Fit, What Fits and What Doesn't?", Business of Fashion, [Online]. Retrieved from the Internet: <URL: http://www.businessoffashion.com/2012/12/fashion-2-0-amongst-promises-of-a-perfect-fit-what-fits-and-what-doesnt.html>, (Dec. 19, 2012), 5 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Rosenfeld, Azriel, "Picture Processing by Computer", Academic Press, (1969), 28 pgs.
Saldanha, Carlos, et al., "System and Method for Displaying Selected Garments on a Computer-Simulated Mannequin", [Online]. Retrieved from the Internet: <URL: http://www.faqs.org/patents/app/20100302275>, (Dec. 2, 2010), 10 pgs.
Slawski, Bill, "Would You Give A Search Engine a 3D Model of Your Body?—SEO by the Sea", [Online]. Retrieved from the Internet: <URL: http://www.seobythesea.com/2009/01/would-you-give-a-search-engine-a-3d-model-of-your-body/>, (Jan. 16, 2009), 11 pgs.
Sterling, Bruce, "Beyond The Beyond—Augmented Reality: Kinect fitting-room for TopShop, Moscow", [Online]. Retrieved from the Internet: <URL: http://www.wired.com/beyond_the_beyond/2011/05/augmented-reality-kinect-fitting-room-for-topshop-moscow/>, (May 10, 2011), 2 pgs.
Stevens, Tim, "Apple patent application opens the door to free-form acoustic gesture commands", [Online]. Retrieved from the Internet: <URL: http://www.engadget.com/2011/02/21/apple-patent-application-opens-the-door-to . . . >, (Feb. 21, 2011), 3 pgs.
Tumbokon, Karen, "Snapchat Update: How To Add Bitmoji To Customizable Geofilters", International Business Times, [Online] Retrieved from the Internet: <URL: https://www.ibtimes.com/snapchat-update-how-add-bitmojicustomizable-geofilters-2448152>, (Nov. 18, 2016), 6 pgs.
Woolley, Richard, "Gesture Commands Performed in Proximity but Without Make Physical Contact with a Touchpad", [Online]. Retrieved from the Internet: <URL: http://www.faqs.org/patents/app/20090167719>, (Jul. 2, 2009), 4 pgs.
Wulfhart, Neil, "The Future of Shopping: An Avatar Lets You Find the Perfect Fit", The Slate Group, [Online]. Retrieved from the Internet: <URL: http://www.slate.com/blogs/future_tense/2012/07/19/me_ality_body_scanner_creates_an_avatar_to_make_clothes_shopping_a_breeze_.html>, (Jul. 19, 2012), 3 pgs.
"International Application Serial No. PCT/US2023/028481, International Search Report mailed Oct. 25, 2023", 4 pgs.
"International Application Serial No. PCT/US2023/028481, Written Opinion mailed Oct. 25, 2023", 6 pgs.

* cited by examiner

VIRTUAL WARDROBE AR EXPERIENCE

TECHNICAL FIELD

The present disclosure relates generally to providing augmented reality (AR) experiences using a messaging application.

BACKGROUND

AR is a modification of a virtual environment. For example, in virtual reality (VR), a user is completely immersed in a virtual world, whereas in AR, the user is immersed in a world where virtual objects are combined with or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
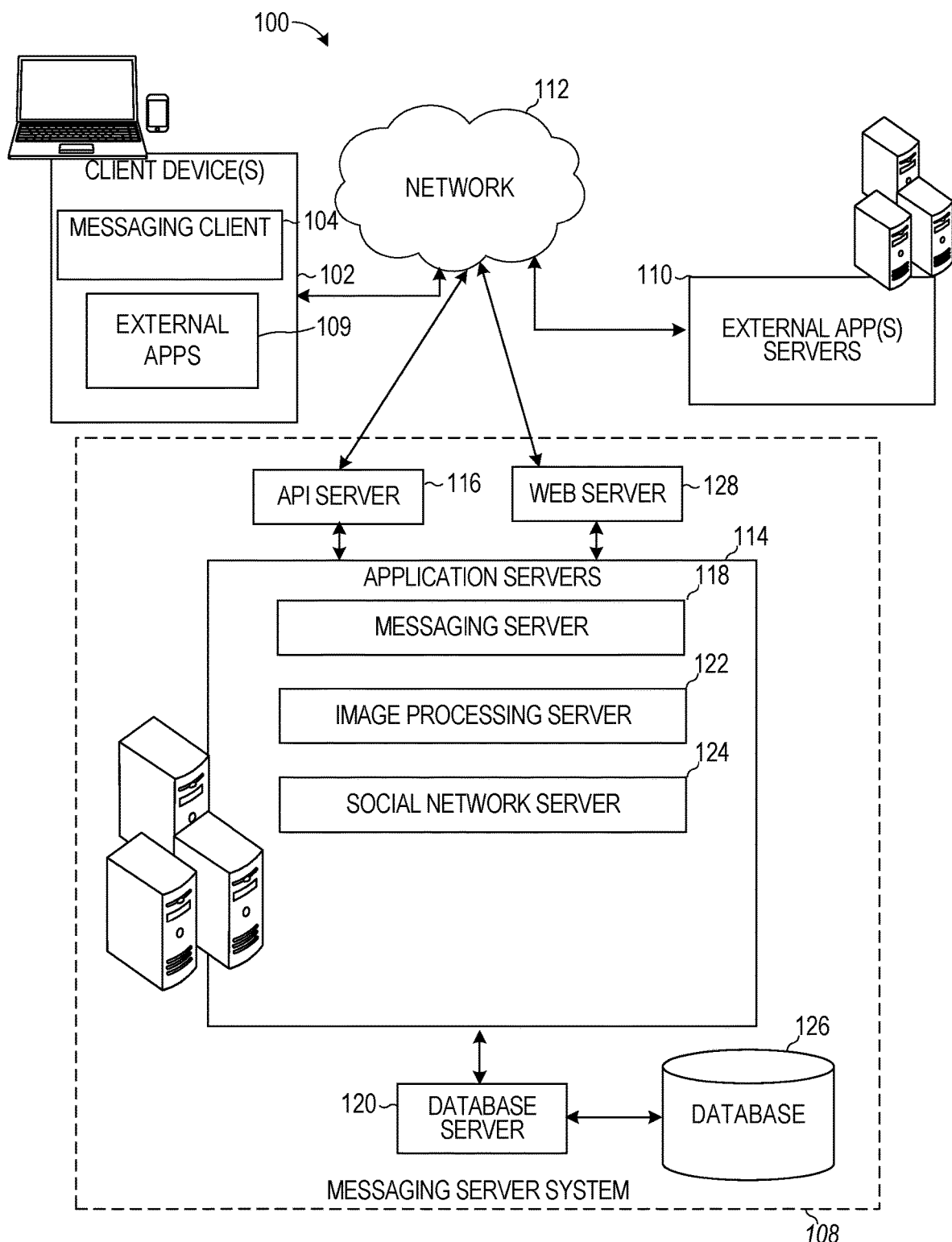
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems allow users to add AR elements to their environment, where the environment comprises captured image data corresponding to a user's surroundings. Such systems can recommend AR elements based on various external factors, such as a current geographical location of the user and various other contextual clues. Some AR systems allow a user to capture a video of themselves or another person and select from a list of available AR elements to add to the image to see how the selected AR element looks on themselves or the person depicted in the image. While these systems generally work well, they limit the user to seeing how predefined AR elements look within their current surroundings. They do not allow the user to see or visualize how customized AR elements look with respect to their surroundings. Creating custom AR elements generally is performed by purchasing or using complicated AR modeling software and capturing hundreds of images of different views of a given physical asset. Because of the complexities involved in creating AR elements, users often are limited to selecting and interacting with AR elements that have been previously defined and generated by $3^{rd}$ parties. Finding such AR elements that are of interest can take a great deal of time and effort.

As such, in accessing a virtual try-on experience, the users may not be fully immersed in the available looks and styles of various fashion items, especially those fashion items that the user may have in their physical possession. This results in the user of these systems having to spend a great deal of effort searching through and navigating multiple user interfaces and pages of information to identify an item of interest. These tasks can be daunting and time consuming, which detracts from the overall interest of using these systems and results in wasted resources.

The disclosed techniques improve the efficiency of using an electronic device that implements or otherwise accesses an AR/VR system by intelligently and automatically generating a 3D virtual fashion item of a real-world fashion item depicted in an image and allowing that 3D virtual fashion item to be placed in a new virtual environment or virtual AR/VR experience. For example, the disclosed techniques access, by a messaging application, an image depicting a real-world fashion item of a user. The disclosed techniques generate, by the messaging application, a 3D virtual fashion item based on the real-world fashion item depicted in the image and store the 3D virtual fashion item in a database that includes a virtual wardrobe that includes a plurality of 3D virtual fashion items associated with the user. The disclosed techniques generate, by the messaging application, an AR experience that allows the user to interact with the virtual wardrobe in unique and engaging ways. In this way, a user can capture an image of their physical fashion items they may have in their possession and visualize how such 3D versions or 3D virtual fashion items would look in different circumstances using one or more AR elements. An article of clothing, garment, or fashion item can include a shirt, pants, skirt, dress, shoes, jewelry, purse, furniture item, household item, eyewear, eyeglasses, AR logos, AR emblems, purse, pants, shorts, skirts, jackets, t-shirts, blouses, glasses, jewelry, earrings, bunny ears, a hat, earmuffs, facial makeup, or any other suitable item or object.

The disclosed techniques generate the 3D virtual fashion item in novel and unique ways using a machine learning model, such as a neural network. Specifically, the neural network is trained based on training data that includes a plurality of training images depicting training fashion items and ground-truth 3D virtual fashion items of the training fashion items. The neural network is applied to a first training image of the plurality of training images that depicts a first training fashion item to estimate a 3D virtual fashion item and the ground-truth 3D virtual fashion item corresponding to the first training image is obtained. The neural network compares the estimated 3D virtual fashion item to the ground-truth 3D virtual fashion item to compute a deviation and updates parameters of the neural network based on the computed deviation. In this way, realistic virtual 3D versions of physical fashion items in the user's possession can be seamlessly and quickly generated by the neural network based on a small set of images or a single image of each respective physical fashion item. Namely, rather than using complicated 3D modeling software that is expensive and difficult to use, the neural network allows novice users to, quickly and inexpensively, generate 3D versions of physical fashion items in their possession to create a sharable virtual wardrobe.

In some examples, the 3D virtual fashion item (or virtual 3D fashion item) can be placed in an AR experience in which a plurality of users are engaged in a conversation. The plurality of users can exchange messages of their virtual 3D fashion items and each can control which virtual 3D fashion items are placed on one or more avatars. A group image can be generated that includes avatars of each of the users engaged in the conversation and which the avatars wear virtual 3D fashion items selected by the users in the conversation. In some cases, the virtual wardrobe including the plurality of 3D virtual fashion items of a user can be selectively shared with one or more other users. The 3D virtual fashion items can be used to develop a fashion item profile for the user to recommend different types of fashion items to the user or to recommend different fashion items to wear on different occasions, such as based on weather or mood of the user. In some examples, certain fashion items can be marked by the user or automatically by the system as private to prevent sharing with the general public or with all of the user's friends. Such fashion items can be restricted to being shared with only a specifically selected group of users.

In this way, the disclosed techniques improve the overall AR functionality and experience of the user in using the electronic device, while also reducing the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Application Program Interfaces (APIs).

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 (sometimes referred to as a client application) is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections, the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
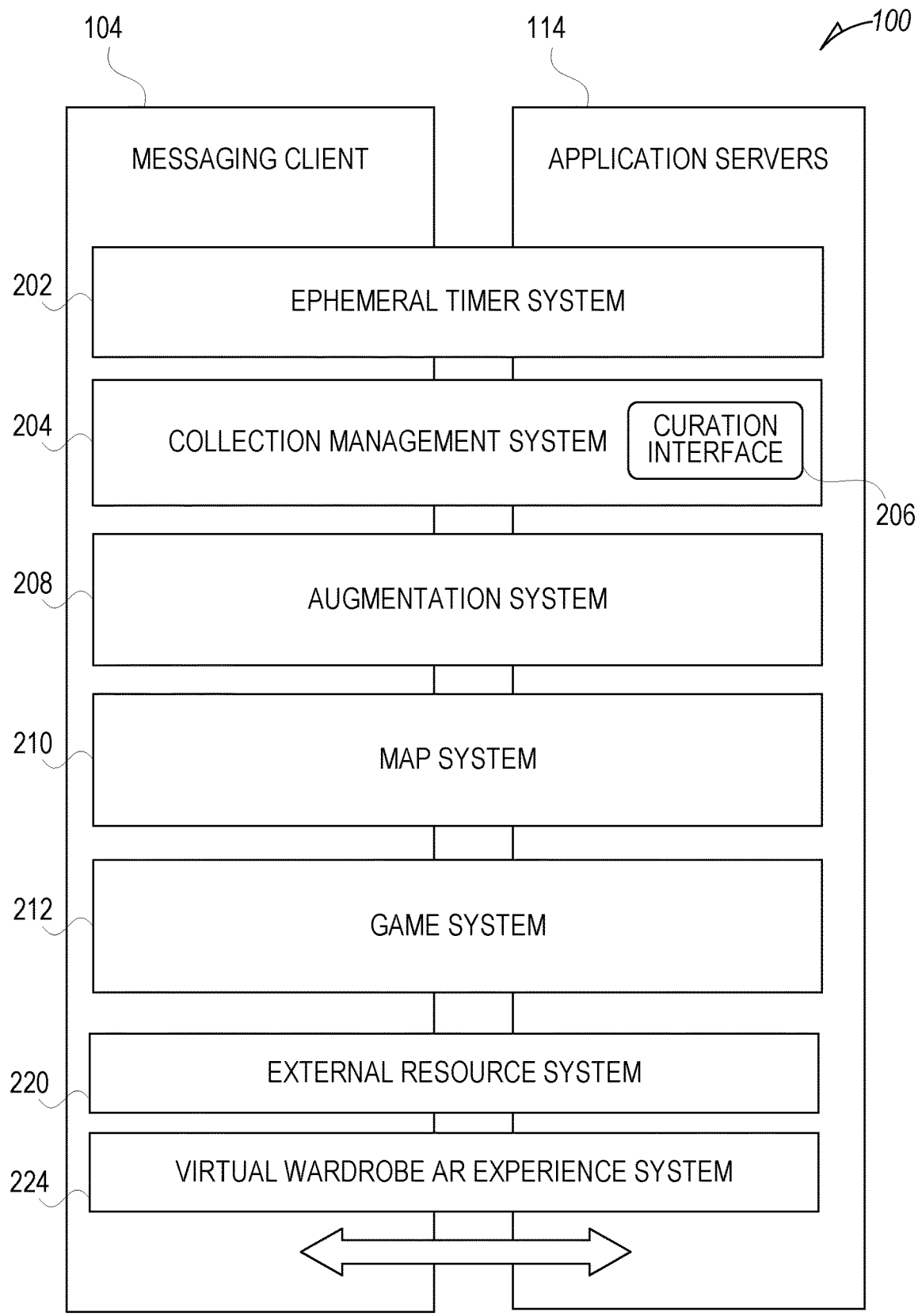
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification.

Figure 3:
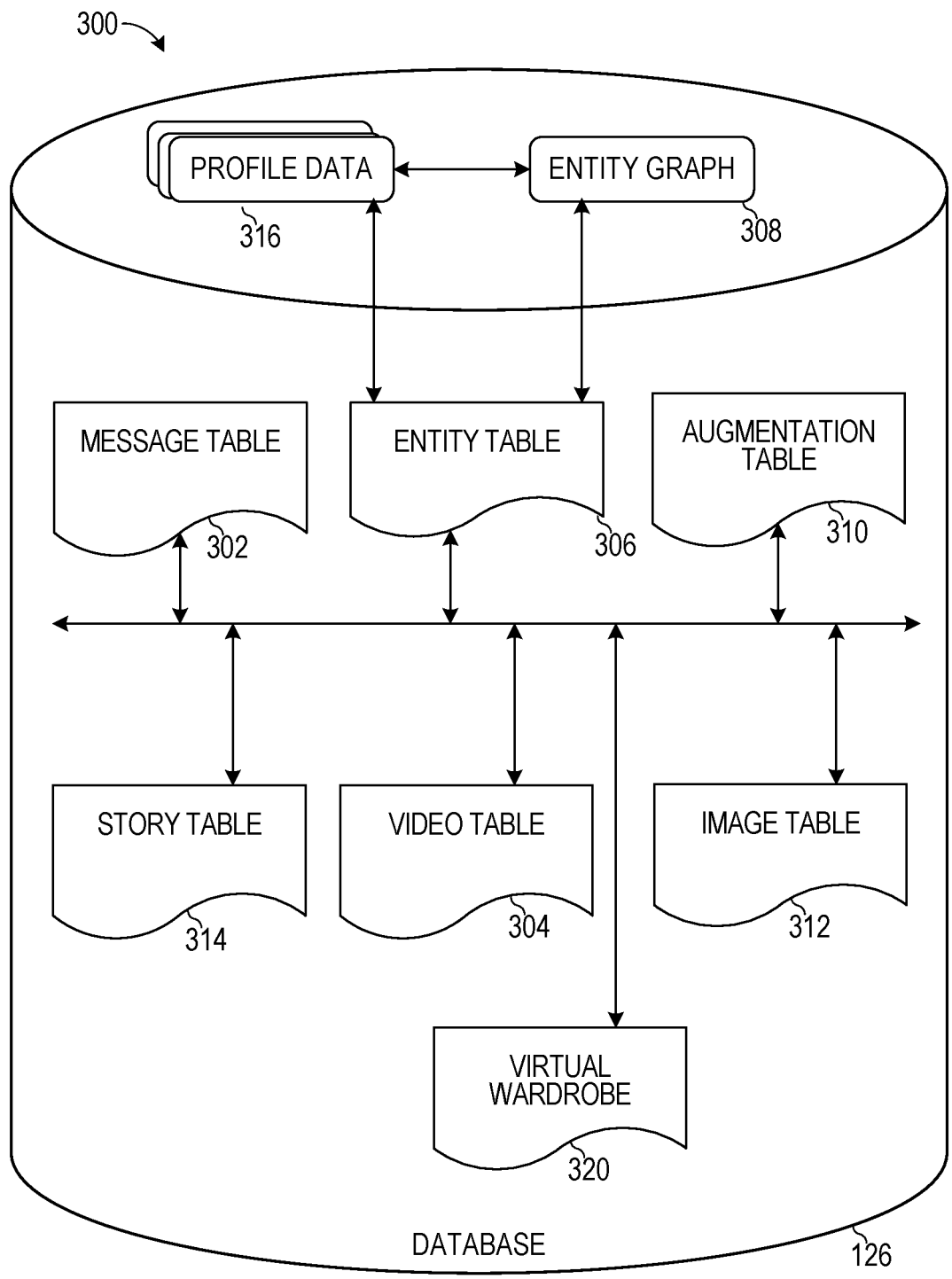
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

In some examples, the messaging client 104 performs some or all of the functions discussed below in connection with the virtual wardrobe AR experience system 224.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a virtual wardrobe AR experience system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, and functions (e.g., commands to invoke functions), as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

The virtual wardrobe AR experience system 224 allows a user to generate a virtual experience (AR or VR) that includes a 3D virtual fashion item created from a single or small set of 2D images of a physical fashion item. For example, the virtual wardrobe AR experience system 224 accesses, by a messaging application (e.g., messaging client 104), an image depicting a real-world fashion item of a user and generates, by the messaging application, a 3D virtual fashion item based on the real-world fashion item depicted in the image. The virtual wardrobe AR experience system 224 stores the 3D virtual fashion item in a database that includes a virtual wardrobe comprising a plurality of 3D virtual fashion items associated with the user and generates, by the messaging application, an AR experience that allows the user to interact with the virtual wardrobe.

In some examples, the real-world fashion item includes at least one of a shirt, pants, a skirt, a dress, jewelry, a purse, eyewear, shorts, a jacket, a blouse, earrings, a hat, ear muffs, shoes, or facial makeup. In such cases, the virtual wardrobe AR experience system 224 determines that the virtual wardrobe includes a threshold quantity of a particular type of 3D virtual fashion items from a plurality of types of the 3D virtual fashion items. The virtual wardrobe AR experience system 224, in response to determining that the virtual wardrobe includes the threshold quantity of the particular type of the 3D virtual fashion item, presenting an indicator of the particular type of the 3D virtual fashion item together with an avatar of the user.

In some examples, the virtual wardrobe AR experience system 224 processes the image depicting the real-world fashion item by a neural network to generate the 3D virtual fashion item. In such cases, the virtual wardrobe AR experience system 224 trains the neural network to generate virtual fashion items. The neural network can be configured to establish a relationship between images depicting real-world fashion items and 3D virtual fashion items of the real-world fashion items. The virtual wardrobe AR experience system 224 performs training operations including: receiving training data comprising a plurality of training images depicting training fashion items and ground-truth 3D virtual fashion items of the training fashion items; applying the neural network to a first training image of the plurality of training images that depicts a first training fashion item to estimate a 3D virtual fashion item; obtaining the ground-truth 3D virtual fashion item corresponding to the first training image; comparing the estimated 3D virtual fashion item to the ground-truth 3D virtual fashion item to compute a deviation; and updating parameters of the neural network based on the computed deviation.

In some examples, the virtual wardrobe AR experience system 224 generates a fashion profile for the user based on the virtual wardrobe. In such cases, the virtual wardrobe AR experience system 224 recommends, based on the fashion profile, a new fashion item to the user based on attributes of one or more 3D virtual fashion items included in the virtual wardrobe. The virtual wardrobe AR experience system 224 searches fashion profiles of one or more other users based on the fashion profile of the user. The virtual wardrobe AR experience system 224 identifies a set of users having similar style as the user based on matching attributes of the fashion profile of the user with attributes of the fashion profiles of the one or more other users.

In some examples, the virtual wardrobe AR experience system 224 determines a current mood or weather associated with a location of the user. The virtual wardrobe AR experience system 224 identifies a set of 3D virtual fashion items that include attributes that match the current mood or the weather associated with the location of the user. The virtual wardrobe AR experience system 224 presents the set of 3D virtual fashion items as suggestions to the user to wear on a given day.

In some examples, the virtual wardrobe AR experience system 224 processes attributes of the virtual wardrobe to estimate a body shape of the user. The virtual wardrobe AR experience system 224 identifies a list of recommended virtual fashion items based on the estimated body shape of the user.

In some examples, the virtual wardrobe AR experience system 224 receives input from the user that selects a subset of the 3D virtual fashion items. The virtual wardrobe AR experience system 224 generates a listing for selling the selected subset of the 3D virtual fashion items.

In some examples, the AR experience includes a virtual try-on experience. In such cases, the virtual wardrobe AR experience system 224 receives a real-time image depicting a person and overlays one or more of the plurality of 3D virtual fashion items on the person depicted in the real-time image.

In some examples, the virtual wardrobe AR experience system 224 receives input from the user to select a subset of the plurality of 3D virtual fashion items to share with one or more friends of the user.

In some examples, the virtual wardrobe AR experience system 224 processes attributes of the plurality of 3D virtual fashion items to identify private 3D virtual fashion items and public 3D virtual fashion items, wherein the subset of the plurality of 3D virtual fashion items is selected from the public 3D virtual fashion items. The virtual wardrobe AR experience system 224 restricts sharing of the private 3D virtual fashion items to a preselected set of friends of the user.

In some examples, the virtual wardrobe AR experience system 224 establishes a conversation interface between the user and a group of friends, each member of the group of friends having a respective virtual wardrobe. The virtual wardrobe AR experience system 224 receives inputs from the user and the group of friends selecting portions of their respective virtual wardrobes and generates, for display in the conversation interface, a group image comprising avatars representing the user and the group of friends together each respectively wearing the selected portions of the virtual wardrobes.

In some examples, the virtual wardrobe AR experience system 224 displays a borrow option in association with a given 3D virtual fashion item of one of the friends. The virtual wardrobe AR experience system 224, in response to receiving input from the user that selects the borrow option, generates a message to one of the friends requesting a corresponding physical fashion item corresponding to the given 3D virtual fashion item.

In some examples, the virtual wardrobe AR experience system 224 receives input that selects a given 3D virtual fashion item from the virtual wardrobe to promote to other users. The virtual wardrobe AR experience system 224 enables the other users to purchase the given 3D virtual fashion item by interacting with the virtual wardrobe of the user using their respective client devices 102.

The virtual wardrobe AR experience system 224 is a component that can be accessed by an AR/VR application implemented on the client device 102. The AR/VR application uses a red, green, blue (RGB) camera to capture an image of a room in a real-world environment. The AR/VR application applies various trained machine learning techniques on the captured image or video of the real-world environment to segment items of the real-world environment. The AR/VR application includes a depth sensor to generate depth data. In some implementations, the AR/VR application continuously captures images of the real-world environment in real time or periodically to continuously or periodically update the locations of the real-world object within a view of the virtual experience. This allows the user to move around in the real world and see how the real-world object looks in different areas of the virtual experience in real time.

An illustrative implementation of the virtual wardrobe AR experience system 224 is shown and described in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to generate a 3D virtual fashion item from a 2D image depicting a physical fashion item. The training data can include a plurality of images (e.g., 2D images depicting fashion items) and videos and their corresponding ground-truth 3D virtual fashion items. The images and videos can include a mix of all sorts of real-world objects that can appear in different rooms in a home or household. The one or more machine learning techniques can be trained to extract features of a received input image or video and establish a relationship between the extracted features and a 3D virtual fashion item. Once trained, the machine learning technique can receive a new image or video depicting a real-world fashion item and can compute or generate a 3D virtual fashion item of the items depicted in the newly received image or video.

The data structures 300 include a virtual wardrobe 320. The virtual wardrobe 320 can be user specific and include a database of virtual 3D fashion items generated for the specific user. Each virtual 3D fashion item can include one or more attributes and an identifier. The virtual wardrobe 320 can be used to generate one or more AR experiences, such as in a conversation interface, virtual try-on, or shopping interface.

Data Communications Architecture

Figure 4:
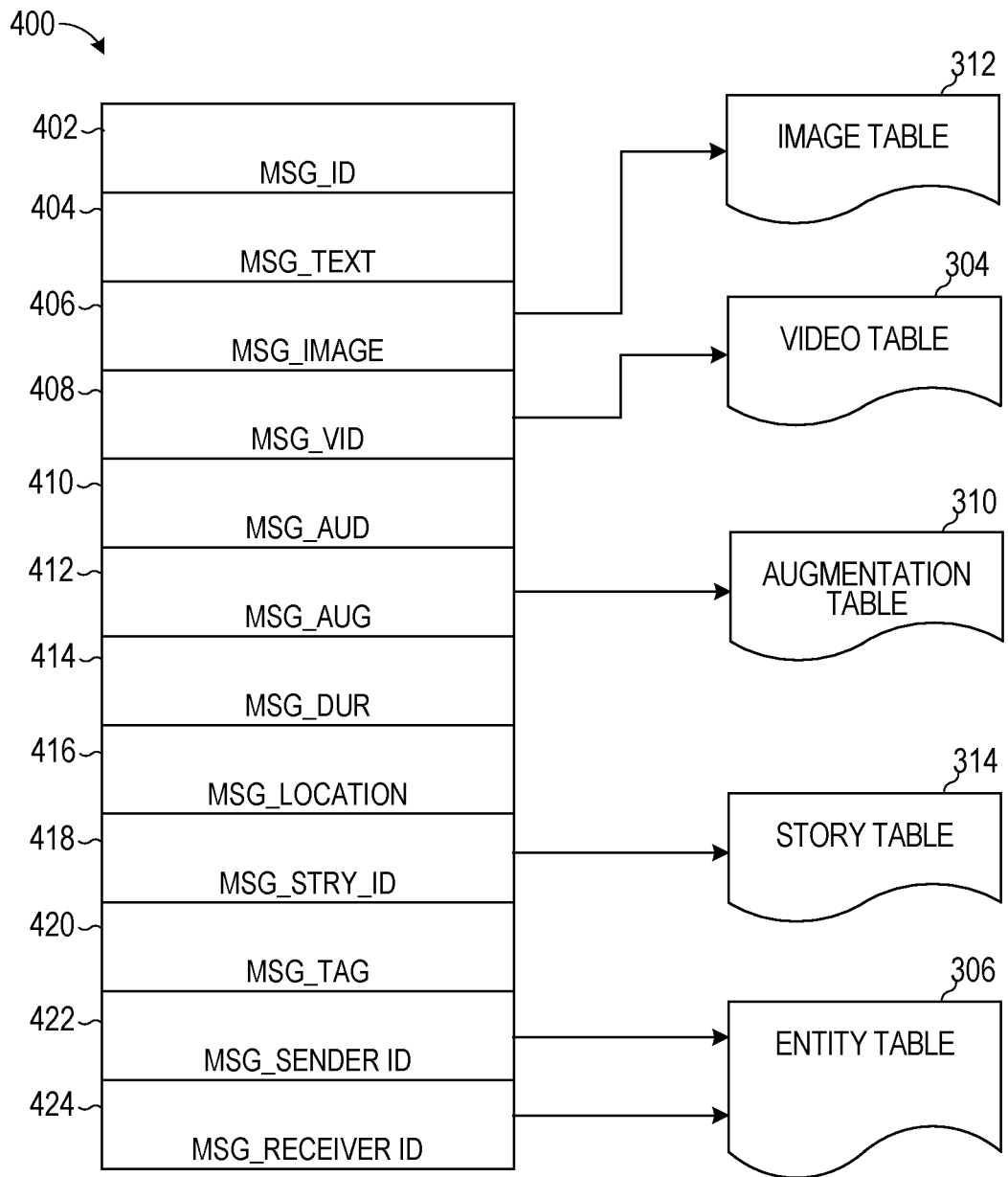
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Virtual Wardrobe AR System

Figure 5:
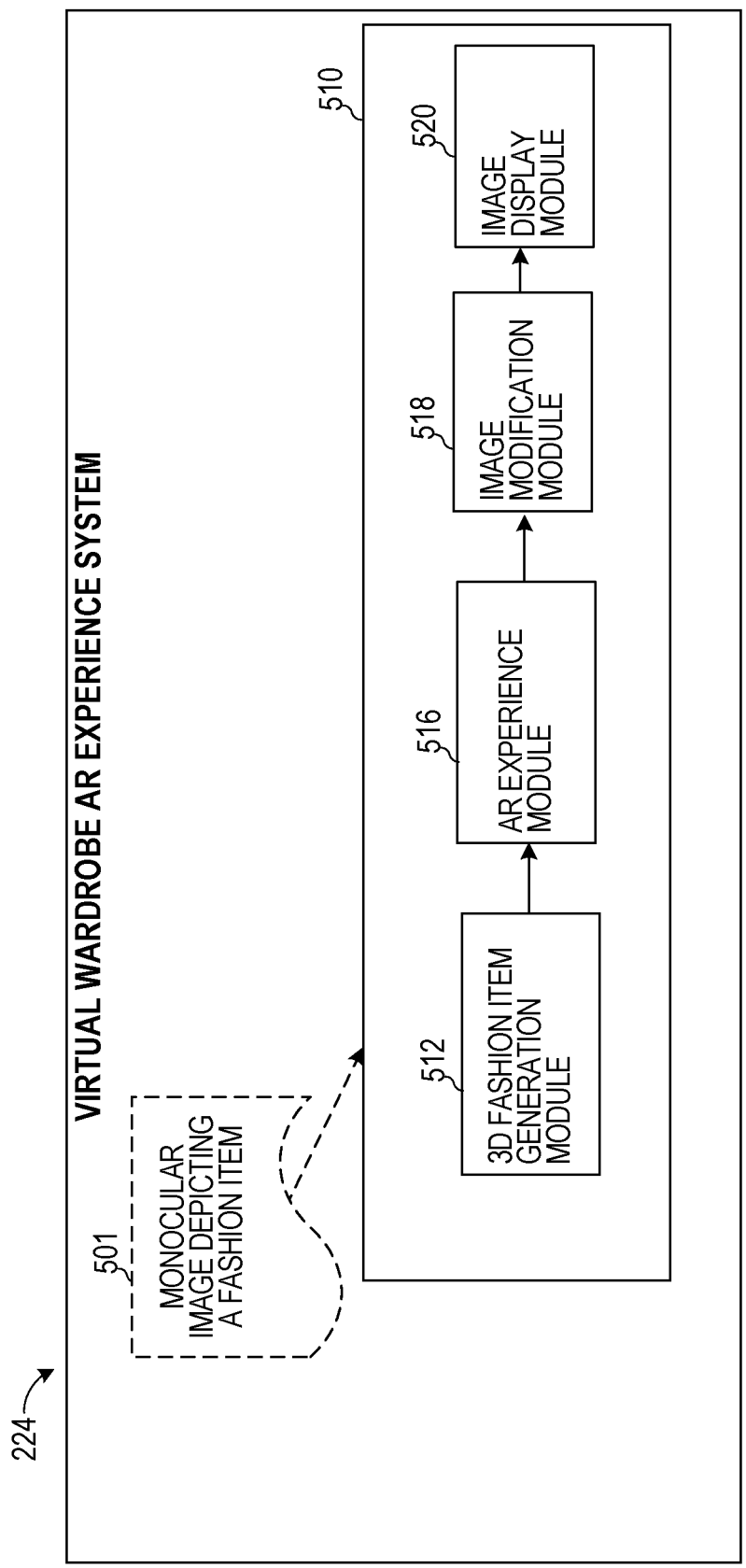
FIG. 5 is a block diagram showing an example virtual wardrobe AR experience system, according to some examples.
Figure 6:
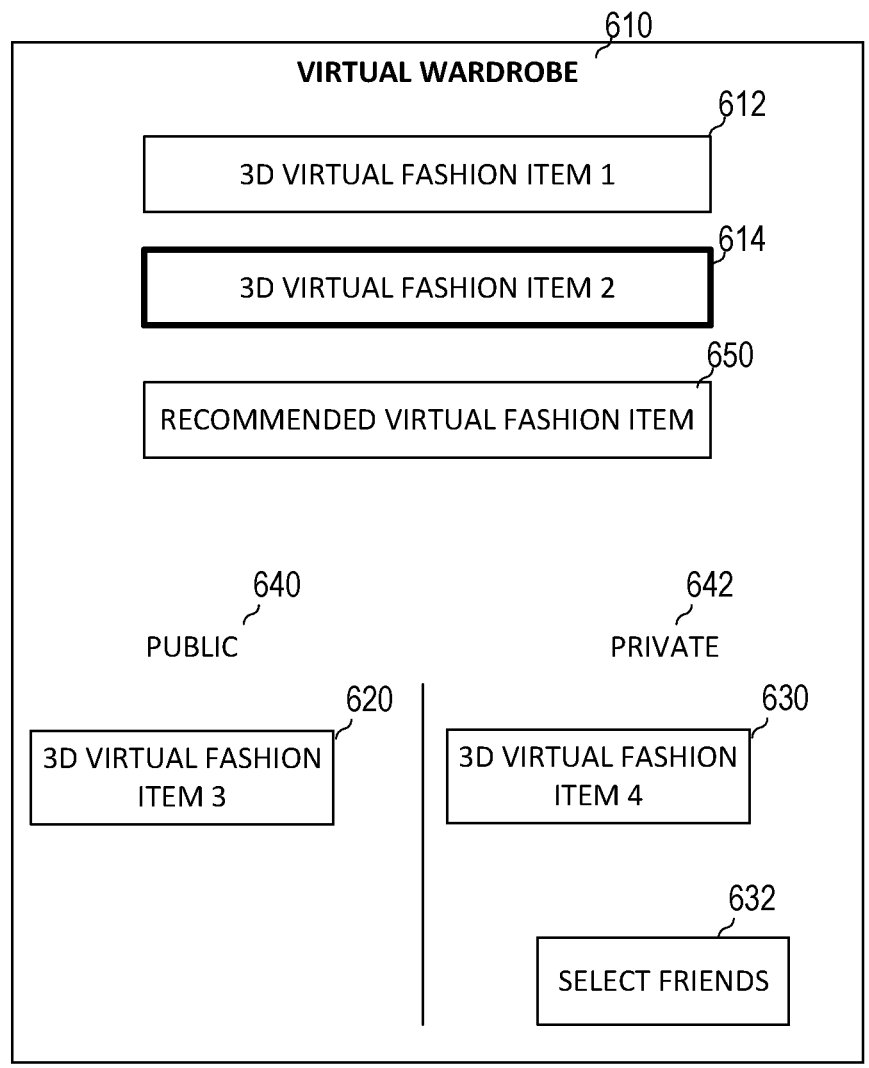
FIGS. 6-9 are diagrammatic representations of outputs of the virtual wardrobe AR experience system, in accordance with some examples.

FIG. 5 is a block diagram showing an example virtual wardrobe AR experience system 224, according to some examples. The virtual wardrobe AR experience system 224 includes a set of components 510 that operate on a set of input data (e.g., a monocular image (or video)) depicting a real-world fashion item 501. The virtual wardrobe AR experience system 224 includes a 3D fashion item generation module 512, an AR experience module 516, an image modification module 518, and an image display module 520. All or some of the components of the virtual wardrobe AR experience system 224 can be implemented by a server, in which case, the monocular image depicting the real-world fashion item 501 is provided to the server by the client device 102. In some cases, some or all of the components of the virtual wardrobe AR experience system 224 can be implemented by the client device 102 or can be distributed across a set of client devices 102 and one or more servers.

The 3D fashion item generation module 512 receives a 2D image, such as a monocular image depicting a fashion item 501 in a real-world environment, such as a user's closet in a home. The 3D fashion item generation module 512 can perform a set of operations to generate an animatable and interactive virtual 3D fashion item based on the fashion item depicted in the image. Specifically, the 3D fashion item generation module 512 includes one or more machine learning models (e.g., neural networks) that operate on a received 2D image of one or more fashion items to generate corresponding one or more virtual 3D fashion items. The 3D fashion items can include visual features that are similar to and resemble features of the fashion items depicted in the 2D image. The visual features can include the same color, the same size, the same texture, the same wrinkles, and so forth of the fashion items depicted in the 2D image.

During training of the 3D fashion item generation module 512, the machine learning technique of the 3D fashion item generation module 512 receives training data including a plurality of training images depicting training real-world fashion items and ground-truth virtual 3D fashion items of the training fashion items from training image data stored in data structures 300. The machine learning technique (e.g., neural network or other machine learning model) is applied to a first training image of the plurality of training images to estimate a virtual 3D fashion item of the training fashion item depicted in the first training image.

The machine learning technique obtains a known or ground-truth virtual 3D fashion item corresponding to the first training image from the training data. The machine learning technique compares (computes a deviation between) the estimated virtual 3D fashion item to the ground-truth virtual 3D fashion item corresponding to the first training image to compute the deviation. Based on a difference threshold of the comparison (or deviation), the machine learning technique updates one or more coefficients or parameters and obtains one or more additional training images. After a specified number of epochs or batches of training images have been processed and/or when a difference threshold (or deviation) (computed as a function of a difference or deviation between the estimated virtual 3D fashion item and the ground-truth virtual 3D fashion item) reaches a specified value, the machine learning technique completes training and the parameters and coefficients of the machine learning technique are stored as a trained machine learning technique.

In an example, after training, the machine learning technique is implemented as part of the 3D fashion item generation module 512 and is configured to receive a monocular input image depicting a real-world fashion item 501 as a single RGB image from a client device 102 or as a video of multiple images. The machine learning technique generates the virtual 3D fashion item estimated from the received 2D image.

The output of the 3D fashion item generation module 512 is provided to the AR experience module 516. For example, the 3D fashion item generation module 512 stores the virtual 3D fashion item in a virtual wardrobe 320 of an account of the user. The virtual wardrobe 320 includes one or more virtual 3D fashion items generated by the user using the 3D fashion item generation module 512. In some cases, a monocular input image depicting a real-world fashion item 501 can be added to the virtual wardrobe 320 without being passed through the 3D fashion item generation module 512. For example, the virtual wardrobe AR experience system 224 receives an image depicting a barcode or other unique identifier of a real-world fashion item of the user. The virtual wardrobe AR experience system 224 can search a public database, over the Internet, for previously generated virtual 3D fashion items corresponding to the barcode or other unique identifier. In response to identifying a previously generated virtual 3D fashion item, the virtual wardrobe AR experience system 224 downloads the virtual 3D fashion item and stores the virtual 3D fashion item in the virtual wardrobe 320 of the user. In response to determining that the previously generated virtual 3D fashion item is not available, the virtual wardrobe AR experience system 224 requests that the user capture one or more 2D images of the real-world fashion item to generate the virtual 3D fashion item using the machine learning model of the 3D fashion item generation module 512.

In some examples, the AR experience module 516 associates a type with each virtual 3D fashion item generated or included in the virtual wardrobe 320. For example, the AR experience module 516 determines that a new virtual 3D fashion item corresponds to a dress type of fashion item. In response, the AR experience module 516 updates a counter indicating the quantity of dress type of fashion items that are included in the virtual wardrobe 320. As another example, the AR experience module 516 determines that a new virtual 3D fashion item corresponds to a pants type of fashion item. In response, the AR experience module 516 updates a counter indicating the quantity of pants type of fashion items that are included in the virtual wardrobe 320.

In some examples, the AR experience module 516 compares the quantity of a given type of fashion item to a threshold. In response to determining that the quantity transgresses the threshold, the AR experience module 516 generates a badge or indicator of the type of fashion item. The AR experience module 516 associates the badge or indicator with an avatar of the user to allow the user to have the badge or indicator displayed together with the avatar for other users to see.

In some examples, the AR experience module 516 allows a user to capture a new image depicting a real-world environment, such as a person. The AR experience module 516 receives input from the user selecting one or more virtual 3D fashion items from the available virtual 3D fashion items included in the virtual wardrobe 320. In response, the AR experience module 516 overlays the selected virtual 3D fashion items on the person depicted in the image. The AR experience module 516 can compute a fit of the person depicted in the image and adjusts the scale of the virtual 3D fashion items that are selected to fit the person depicted in the image. The AR experience module 516 can track movement of the person in the images captured by the camera of the client device 102 and updates automatically the positioning and placement in 3D of the selected virtual 3D fashion items. In some examples, the AR experience module 516 communicates the selected virtual 3D fashion items to the image modification module 518, which receives a real-time video feed from a camera of the client device 102. The image modification module 518 modifies the real-time video feed to depict the selected virtual 3D fashion items together with the real-world environment and provides the modified images to the image display module 520 for display to one or more users.

FIGS. 6-9 are diagrammatic representations of outputs of the virtual wardrobe AR experience system 224, in accordance with some examples. For example, the virtual wardrobe AR experience system 224 receives input from a user to access the virtual wardrobe 320. In response, the virtual wardrobe AR experience system 224 retrieves identifiers of all of the virtual 3D fashion items included in the virtual wardrobe 320. The virtual wardrobe AR experience system 224 presents a user interface 600 on a client device 102 of the user. The user interface 600 includes a screen 610 representing the virtual wardrobe 320.

In some examples, the screen 610 includes identifiers of each or a subset of the virtual 3D fashion items included in the virtual wardrobe 320. The virtual wardrobe AR experience system 224 can access metadata of each virtual 3D fashion item to obtain one or more attributes of the virtual 3D fashion item and/or to determine a classification (e.g., private or public) automatically or manually selected for each virtual 3D fashion item. The public classification can be associated with virtual 3D fashion items that are available to all of the user's friends or any user of the messaging client 104. The private classification can be associated with virtual 3D fashion items to limit which small set of users have access to the virtual 3D fashion item. Namely, if the virtual wardrobe 320 is shared by the user on the messaging client 104, the virtual wardrobe AR experience system 224 can automatically control which portions (e.g., which virtual 3D fashion items) are visible and interactable by certain users, such as based on the classification.

In some cases, the virtual wardrobe AR experience system 224 automatically determines the classification of each virtual 3D fashion item, such as based on one or more attributes. For example, if the virtual wardrobe AR experience system 224 determines that a particular virtual 3D fashion item corresponds to undergarments, the virtual wardrobe AR experience system 224 automatically associates the virtual fashion item with the private classification. For example, if the virtual wardrobe AR experience system 224 determines that a particular virtual 3D fashion item corresponds to sunglasses, the virtual wardrobe AR experience system 224 automatically associates the virtual fashion item with the public classification.

In some cases, the virtual wardrobe AR experience system 224 can determine that a first 3D virtual fashion item 612 is not classified as private or public. In such cases, the virtual wardrobe AR experience system 224 presents the first 3D virtual fashion item 612 in a top portion of the screen 610. The virtual wardrobe AR experience system 224 can allow the user to select the first 3D virtual fashion item 612 directly from the screen 610. In response, the virtual wardrobe AR experience system 224 automatically activates a camera of the client device 102 and presents the camera feed or video feed from the camera together with the selected first 3D virtual fashion item 612. The virtual wardrobe AR experience system 224 can detect a person in the video feed and, in response, the virtual wardrobe AR experience system 224 automatically scales and fits the selected first 3D virtual fashion item 612 on the real-world person depicted in the video feed.

The virtual wardrobe AR experience system 224 can receive an exit command. In response, the virtual wardrobe AR experience system 224 returns the user to the screen 610. The virtual wardrobe AR experience system 224 can receive input that drags the first 3D virtual fashion item 612 to a public region 640 or private region 642 of the screen 610. In response to determining that the first 3D virtual fashion item 612 has been dragged to the public region 640, the virtual wardrobe AR experience system 224 associates the first 3D virtual fashion item 612 with a public classification and presents the first 3D virtual fashion item 612 in the public region 640 of the screen 610 together with another virtual 3D fashion item 620. In response to determining that the first 3D virtual fashion item 612 has been dragged to the private region 642, the virtual wardrobe AR experience system 224 associates the first 3D virtual fashion item 612 with a private classification and presents the first 3D virtual fashion item 612 in the private region 642 of the screen 610 together with another private virtual 3D fashion item 630.

The virtual wardrobe AR experience system 224 can receive input that selects a select friends option 632 from the private region 642. In response, the virtual wardrobe AR experience system 224 presents a list of friends of the user in a new window or overlay and receives input from the user that selects one or more friends in the list. Any friend that is selected in the list is provided with access to see and interact with virtual 3D fashion items associated with the private classification, such as the private virtual 3D fashion item 630.

In some examples, the virtual wardrobe AR experience system 224 processes attributes of the virtual 3D fashion items included in the virtual wardrobe 320. The virtual wardrobe AR experience system 224 automatically generates a fashion profile for the user based on the attributes of the virtual 3D fashion items. The virtual wardrobe AR experience system 224 can automatically identify one or more new virtual 3D fashion items 614 that match one or more preferences in the fashion profile. The virtual wardrobe AR experience system 224 presents an indicator that visually highlights or visually distinguishes the one or more new virtual 3D fashion items as recommended virtual fashion items 650. The indicator can be a bold or colorful border around the one or more new recommended virtual fashion items 650. In response to receiving a user selection of the recommended virtual fashion items 650, the virtual wardrobe AR experience system 224 launches a try-on experience in which the user can see how the recommended virtual fashion items 650 fit or look on the user in a camera feed of the client device 102.

In some examples, the virtual wardrobe AR experience system 224 computes or estimates a body shape of the user based on the fashion profile and/or attributes of the virtual 3D fashion items included in the virtual wardrobe 320. The virtual wardrobe AR experience system 224 searches for one or more virtual 3D fashion items to recommend to the user based on the body shape of the user.

In some examples, the virtual wardrobe AR experience system 224 obtains attributes or preferences of the fashion profile of one user and identifies one or more fashion profiles or other users that include similar attributes or preferences. Namely, the virtual wardrobe AR experience system 224 compares the attributes or preferences of the fashion profile of the user to the attributes or preferences of the fashion profiles of one or more other users (who may or may not be friends with the user on the messaging client 104). The virtual wardrobe AR experience system 224 computes similarity scores of the fashion profiles based on the comparison and identifies a subset of fashion profiles that are associated with similarity scores that transgress or exceed a similarity threshold. The virtual wardrobe AR experience system 224 identifies the users associated with the subset of the fashion profile and recommends the identified users for the user to connect with on the messaging client 104. In some cases, the virtual wardrobe AR experience system 224 presents an option for the user to access public portions of the virtual wardrobes of the identified users and can visually distinguish or highlight one or more virtual 3D fashion items included in the virtual wardrobes of the identified users which are not included in the virtual wardrobe 320 of the user.

In some examples, the virtual wardrobe AR experience system 224 processes information associated with the user or a current geographical location of the user on a given day. The virtual wardrobe AR experience system 224 can determine a current mood of the user and/or current weather conditions at the geographical location of the user. Based on the current mood of the user and/or current weather conditions at the geographical location of the user, the virtual wardrobe AR experience system 224 searches attributes of the virtual 3D fashion items included in the virtual wardrobe 320 to identify a set of 3D virtual fashion items 614 to recommend to the user to wear on the given day. The virtual wardrobe AR experience system 224 presents the identified set of the 3D virtual fashion items 614 on the screen 610 optionally with an indication of the current mood of the user and/or current weather conditions at the geographical location of the user.

In some examples, the virtual wardrobe AR experience system 224 receives input from the user that selects a given virtual 3D fashion item from the screen 610. In response to receiving the input, the virtual wardrobe AR experience system 224 presents an option to sell the physical fashion item corresponding to the given virtual 3D fashion item. In response to receiving input that selects the option to sell, the virtual wardrobe AR experience system 224 automatically generates a listing for the virtual 3D fashion item and publishes the listing on an online marketplace for other users to buy. In response to receiving an indication that another user purchased the virtual 3D fashion item, the virtual wardrobe AR experience system 224 notifies the user to ship the corresponding physical fashion item to the other user. The virtual wardrobe AR experience system 224 can also receive input to promote a given virtual 3D fashion item. In such cases, the virtual wardrobe AR experience system 224 can visually highlight the promoted given virtual 3D fashion item when other users browse the virtual wardrobe 320 of the user. The virtual wardrobe AR experience system 224 can offer discounts or promotions to the users who are browsing the virtual wardrobe 320 to purchase the promoted virtual 3D fashion item.

Figure 7:
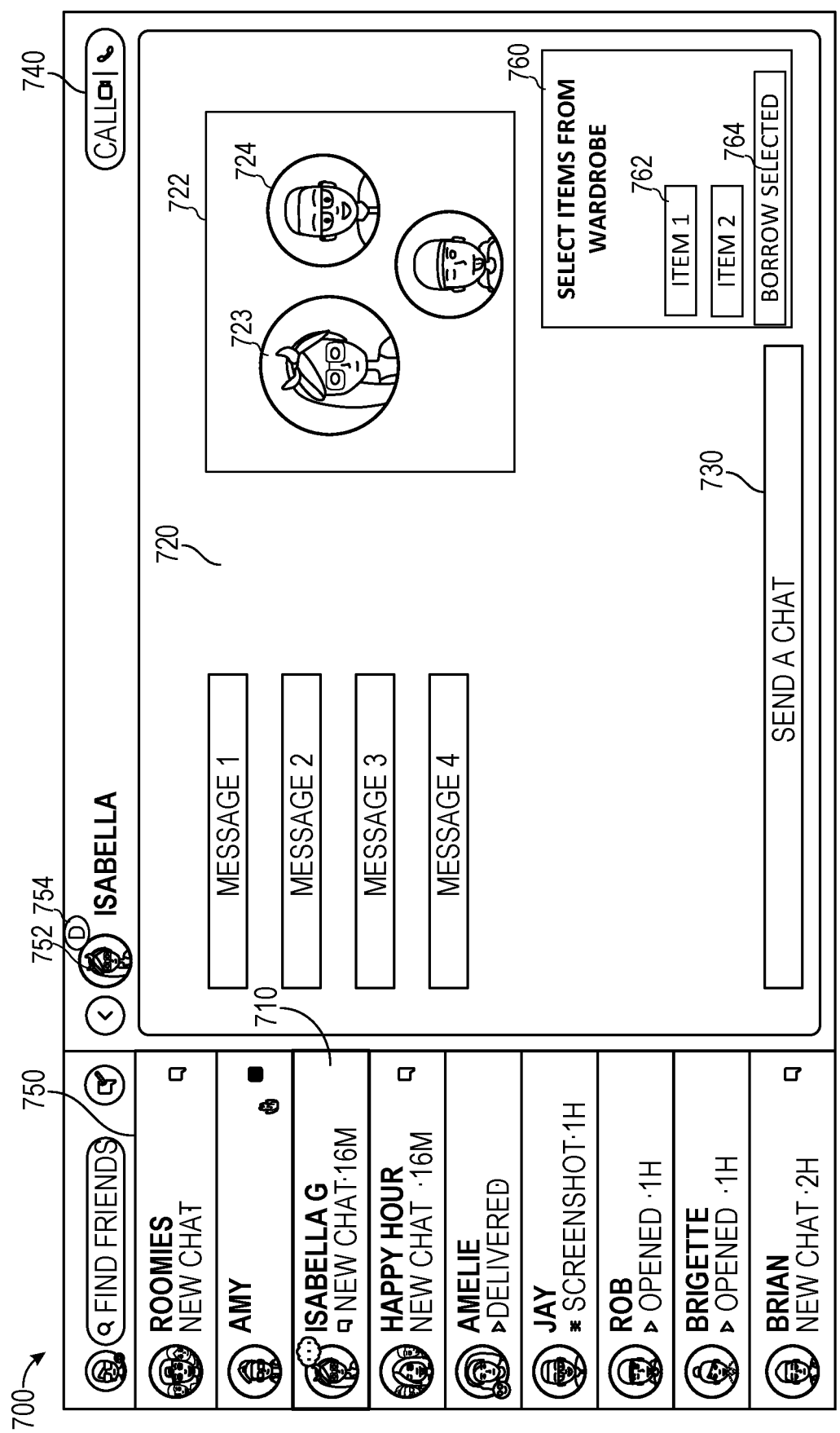

In some examples, the virtual wardrobe AR experience system 224 allows the user to engage in a conversation with one or more friends of the user on the messaging client 104. Specifically, the virtual wardrobe AR experience system 224 presents a conversation interface 700, as shown in FIG. 7. The conversation interface 700 includes a list of friends 750 including a first friend 710 with whom the user has previously established a conversation. The virtual wardrobe AR experience system 224 presents a chat region 720 representing one or more messages exchanged in the conversation with the first friend 710. The chat region 720 includes a call option 740 to establish an audio or video call with the first friend 710. The chat region 720 includes a chat input region 730 for composing a new message to exchange in the conversation.

In some examples, the virtual wardrobe AR experience system 224 presents an avatar 752 for the first friend 710 involved in the conversation. The virtual wardrobe AR experience system 224 can determine that the first friend 710 has generated more than a threshold quantity of virtual 3D fashion items of a certain type of fashion item (e.g., a dress). In response, the virtual wardrobe AR experience system 224 presents an indicator 754 together with the avatar 752 to inform other users that the first friend 710 has gained a badge or indicator representing that the first friend 710 has generated more than the threshold quantity of virtual 3D fashion items.

The chat region 720 includes a virtual wardrobe navigation region 760. The virtual wardrobe navigation region 760 lists all or a subset of virtual 3D fashion items 762 of the virtual wardrobe of the first friend 710. The virtual wardrobe navigation region 760 can receive input that selects a particular virtual 3D fashion item 762 and, in response, the virtual wardrobe AR experience system 224 retrieves the corresponding virtual 3D fashion item 762 from the virtual wardrobe of the first friend 710. The virtual wardrobe AR experience system 224 launches an AR experience that presents the retrieved virtual 3D fashion item 762 together with a video feed or image depicting the user. The virtual wardrobe navigation region 760 includes a borrow selected option 764. In response to receiving input that selects the borrow selected option 764, the virtual wardrobe AR experience system 224 transmits a message to the first friend 710 identifying one or more virtual 3D fashion items 762 that have been selected by the user and requested to be borrowed. The first friend 710 can allow or prevent borrowing. In response to receiving input that allows borrowing, the virtual wardrobe AR experience system 224 confirms the borrowing request to the user and instructs the first friend 710 to make the corresponding physical fashion item available to the user.

In some examples, users involved in exchanging messages in the chat region 720 can coordinate outfits together to be worn on a particular day or occasion. In such cases, the virtual wardrobe AR experience system 224 presents a group image 722 that depicts avatars 723 and 724 of the users engaged in the conversation. For example, the avatars 723 and 724 can represent the user and the first friend 710. The virtual wardrobe AR experience system 224 can receive input from the user that selects a particular outfit or set of fashion items from the virtual 3D fashion items of the virtual wardrobe 320 of the user. In response, the virtual wardrobe AR experience system 224 applies the particular outfit to the avatar 723 of the user. Similarly, the virtual wardrobe AR experience system 224 can receive input from the user or from the first friend 710 that selects a particular outfit or set of fashion items from the virtual 3D fashion items of the virtual wardrobe 320 of the first friend 710. In response, the virtual wardrobe AR experience system 224 applies the particular outfit to the avatar 724 of the first friend. This way, the user and the first friend can see how they look together wearing the selected outfits. The user can select virtual 3D fashion items from the user's virtual wardrobe 320 or the virtual wardrobe 320 of the first friend and can select to apply the selected virtual 3D fashion items to the user's avatar 723 or the avatar 724 of the first friend.

Figure 8:
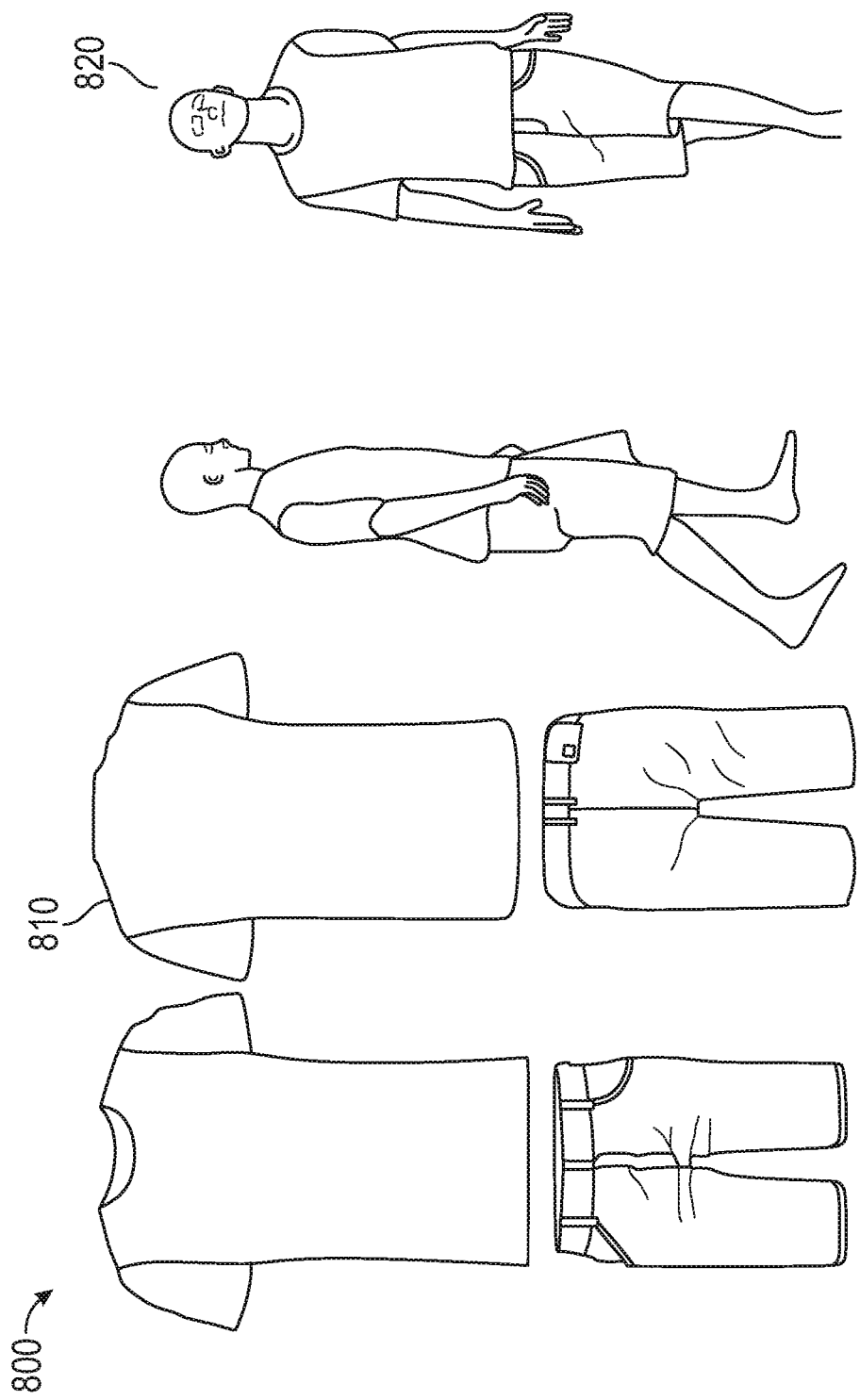
Figure 9:
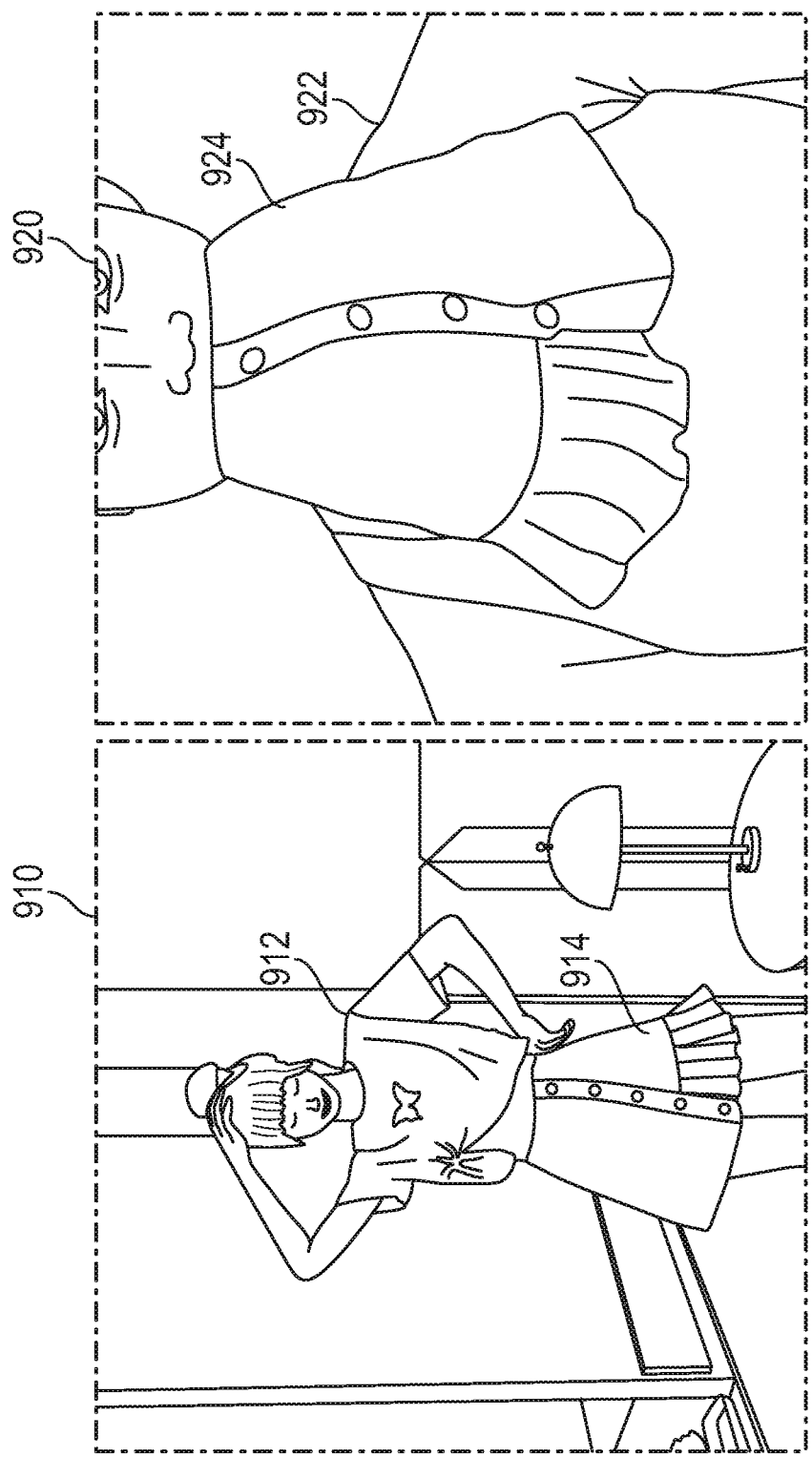

In some examples, the screen 610 (FIG. 6) includes a generate new virtual 3D fashion item option (not shown). In response, the virtual wardrobe AR experience system 224 instructs the user to capture one or more 2D images of a target real-world fashion item. For example, as shown in FIG. 8, the virtual wardrobe AR experience system 224 receives a set of images 810 depicting a real-world fashion item. The virtual wardrobe AR experience system 224 processes the set of images 810 and generates virtual 3D fashion items 820 corresponding to the real-world fashion item depicted in the set of images 810.

As another example, in response to receiving selection of the generate new virtual 3D fashion item option, the virtual wardrobe AR experience system 224 instructs the user to capture one or more 2D images of a target real-world fashion item. For example, as shown in example 900 of FIG. 9, the virtual wardrobe AR experience system 224 receives a set of images 910 depicting a person 912 wearing a real-world fashion item 914. The virtual wardrobe AR experience system 224 processes the set of images 910 and generates virtual 3D fashion items 924 corresponding to the real-world fashion item 914 depicted in the set of images 910.

The virtual wardrobe AR experience system 224 can animate the virtual 3D fashion item 924 by rotating the virtual 3D fashion item 924 about its axis 360 degrees in front of another person 922 depicted in a real-time video feed 920. The virtual wardrobe AR experience system 224 can receive input that selects a try-on option. In response, the virtual wardrobe AR experience system 224 stops animating the virtual 3D fashion item 924 and applies the virtual 3D fashion item 924 to a portion of the body of the person 922 depicted in the video feed 920. The virtual wardrobe AR experience system 224 tracks movement of the person 922 and updates the 3D positioning of the virtual 3D fashion item 924.

Figure 10:
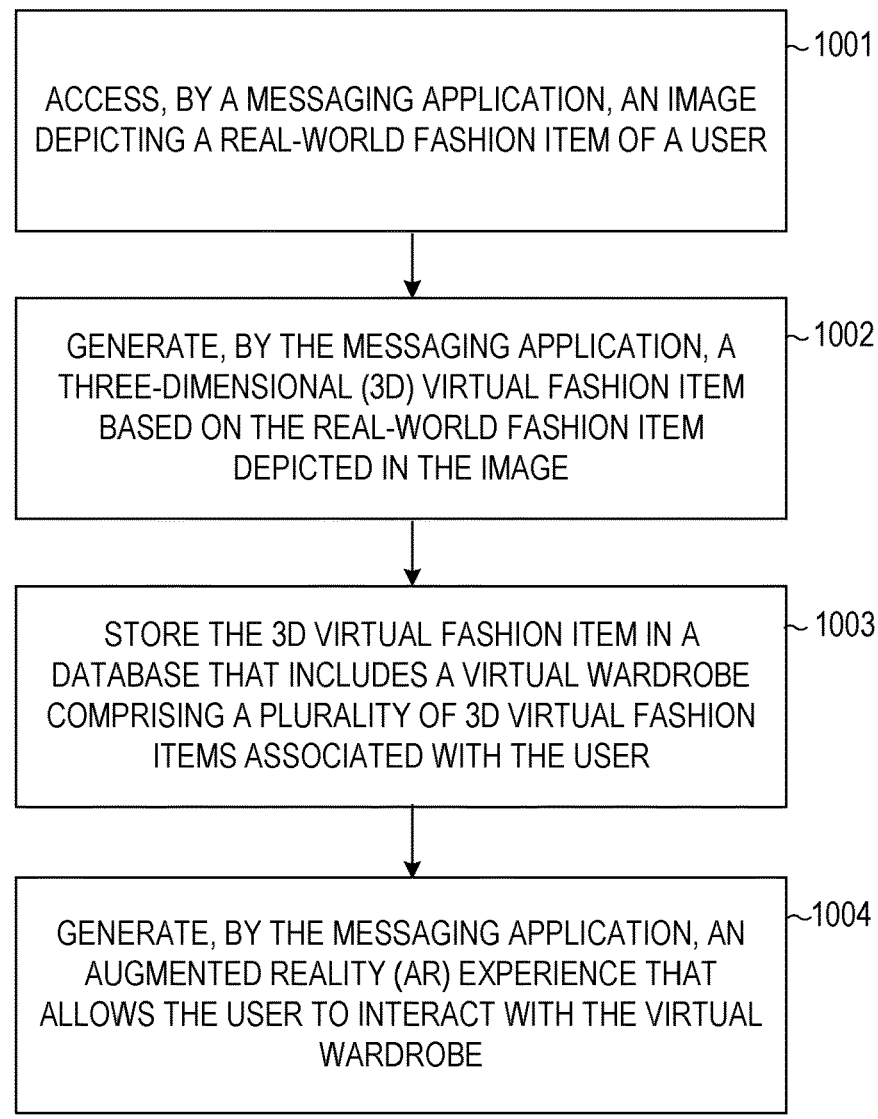
FIG. 10 is a flowchart illustrating example operations of the virtual wardrobe AR experience system, according to some examples.

FIG. 10 is a flowchart of a process 1000, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 accesses, by a messaging application, an image depicting a real-world fashion item of a user, as discussed above.

At operation 1002, the client device 102 generates, by the messaging application, a 3D virtual fashion item based on the real-world fashion item depicted in the image, as discussed above.

At operation 1003, the client device 102 stores the 3D virtual fashion item in a database that includes a virtual wardrobe comprising a plurality of 3D virtual fashion items associated with the user, as discussed above.

At operation 1004, the client device 102 generates, by the messaging application, an AR experience that allows the user to interact with the virtual wardrobe, as discussed above.

Machine Architecture

Figure 11:
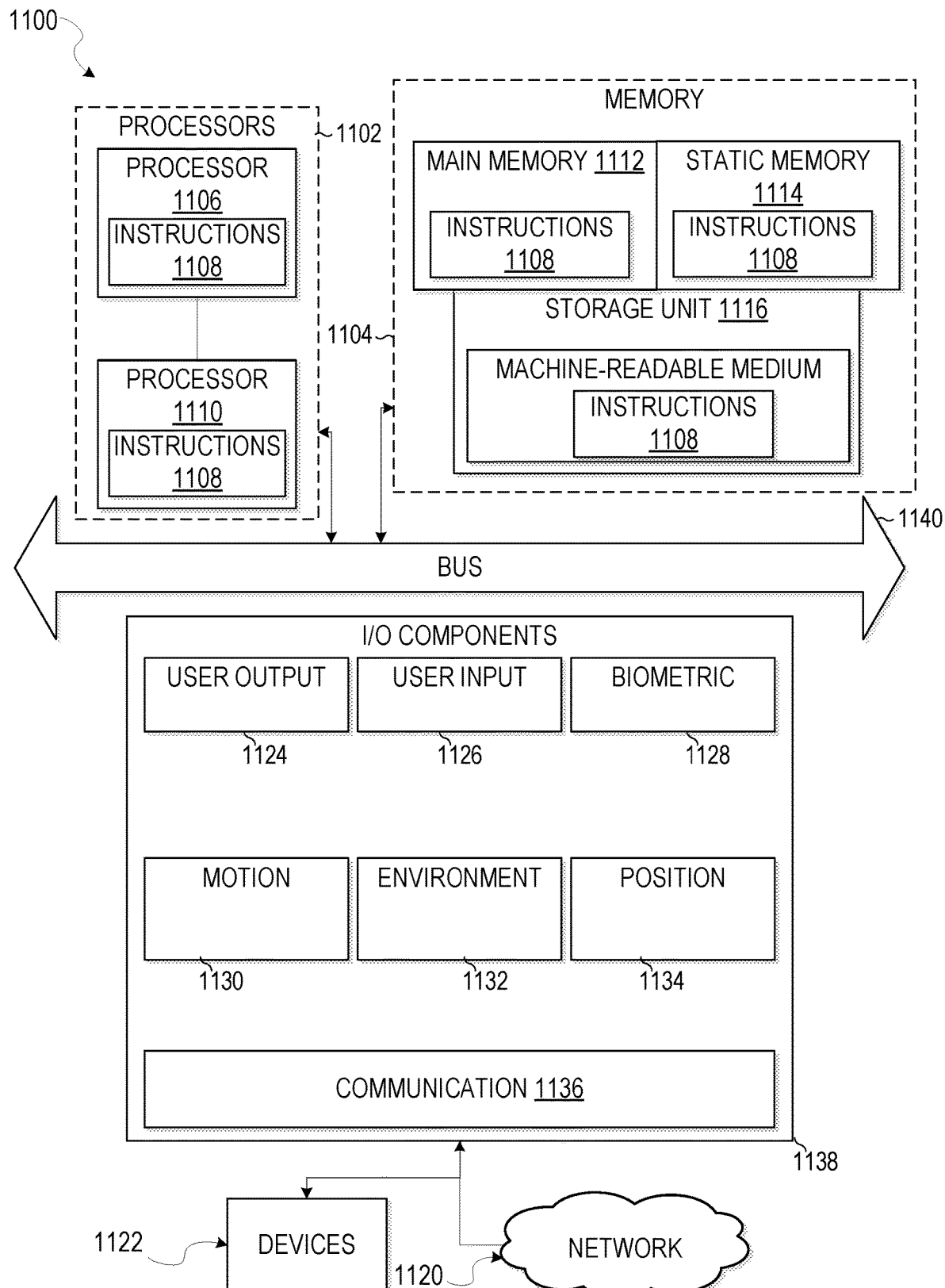
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within a machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, and rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., HTTP). Similarly, the instructions 1108 may be transmitted or received using a transmission medium via a coupling (e.g., a peer-to-peer coupling) to the devices 1122.

Software Architecture

Figure 12:
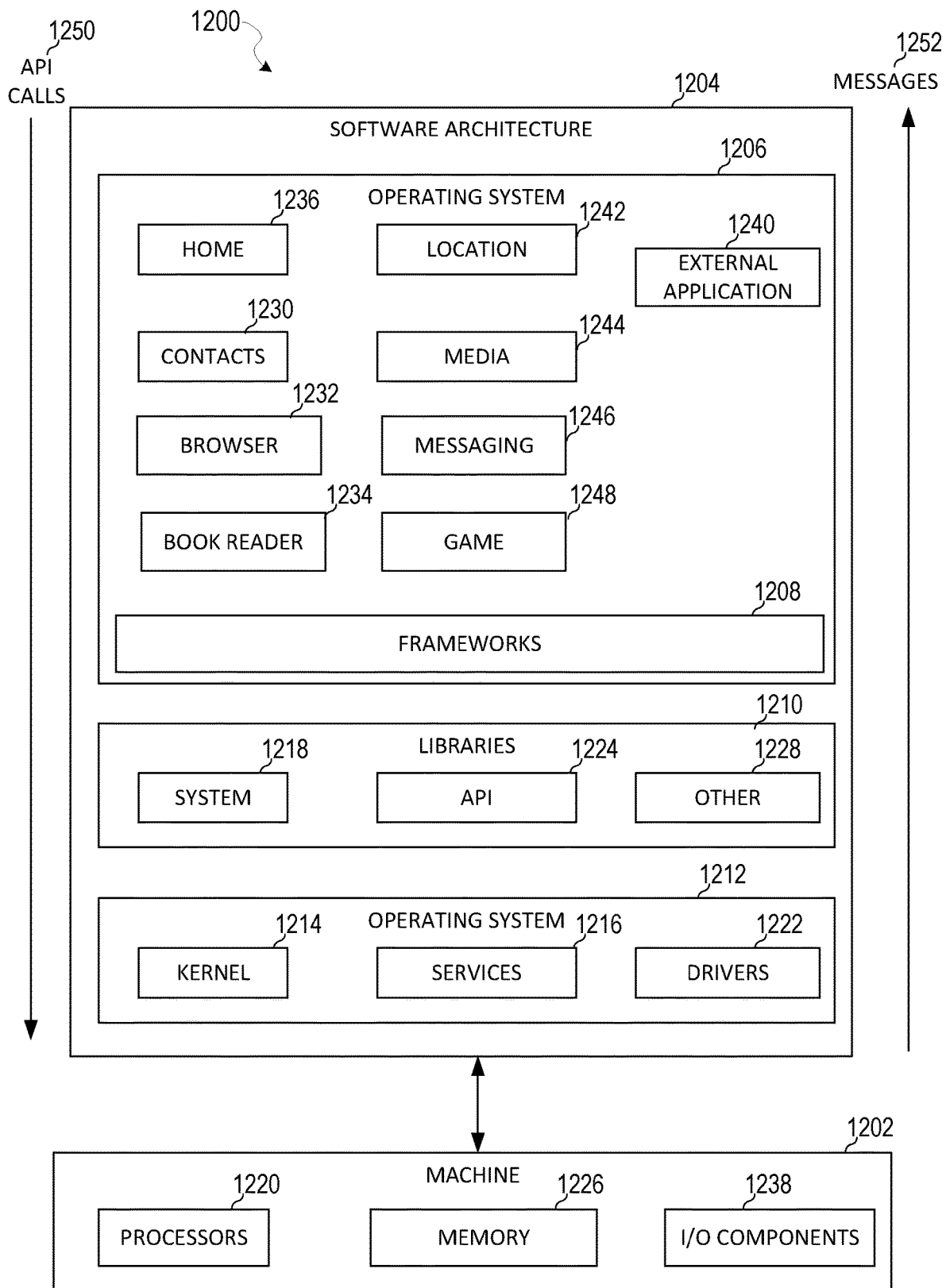
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
accessing, by an application, an image depicting a real-world fashion item of a user;
generating, by the application, a three-dimensional (3D) virtual fashion item based on the real-world fashion item depicted in the image;
storing the 3D virtual fashion item in a database that includes a virtual wardrobe comprising a plurality of 3D virtual fashion items associated with the user;
generating, by the application, an augmented reality (AR) experience that allows the user to interact with the virtual wardrobe, the AR experience comprising:
receiving inputs from the user and a group of friends selecting portions of their respective virtual wardrobes; and
generating, for display in a conversation interface, a group image comprising avatars representing the user and the group of friends together each respectively wearing the selected portions of the virtual wardrobes.

2. The method of claim 1, wherein the real-world fashion item includes at least one of a shirt, pants, a skirt, a dress, jewelry, a purse, eyewear, shorts, a jacket, a blouse, earrings, a hat, ear muffs, shoes, or facial makeup, further comprising:
determining that the virtual wardrobe includes a threshold quantity of a particular type of 3D virtual fashion items from a plurality of types of the 3D virtual fashion items; and
in response to determining that the virtual wardrobe includes the threshold quantity of the particular type of the 3D virtual fashion item, presenting an indicator of the particular type of the 3D virtual fashion item together with an avatar of the user.

3. The method of claim 1, further comprising processing the image depicting the real-world fashion item by a neural network to generate the 3D virtual fashion item.

4. The method of claim 3, further comprising training the neural network to generate virtual fashion items, the neural network configured to establish a relationship between images depicting real-world fashion items and 3D virtual fashion items of the real-world fashion items.

5. The method of claim 4, further comprising performing training operations comprising:
receiving training data comprising a plurality of training images depicting a training fashion items and ground-truth 3D virtual fashion items of the training fashion items;
applying the neural network to a first training image of the plurality of training images that depicts a first training fashion item to estimate a 3D virtual fashion item;
obtaining the ground-truth 3D virtual fashion item corresponding to the first training image;
comparing the estimated 3D virtual fashion item to the ground-truth 3D virtual fashion item to compute a deviation; and
updating parameters of the neural network based on the computed deviation.

6. The method of claim 1, further comprising generating a fashion profile for the user based on the virtual wardrobe.

7. The method of claim 6, further comprising:
recommending, based on the fashion profile, a new fashion item to the user based on attributes of one or more 3D virtual fashion items included in the virtual wardrobe.

8. The method of claim 6, further comprising:
searching fashion profiles of one or more other users based on the fashion profile of the user; and
identifying a set of users having similar style as the user based on matching attributes of the fashion profile of the user with attributes of the fashion profiles of the one or more other users.

9. The method of claim 1, further comprising:
determining a current mood or weather associated with a location of the user;
identifying a set of 3D virtual fashion items that include attributes that match the current mood or the weather associated with the location of the user; and
presenting the set of 3D virtual fashion items as suggestions to the user to wear on a given day.

10. The method of claim 1, further comprising:
receiving training data comprising a plurality of training images depicting a training fashion items and ground-truth 3D virtual fashion items of the training fashion items;
applying a neural network to a first training image of the plurality of training images that depicts a first training fashion item to estimate a 3D virtual fashion item;
updating parameters of the neural network based on a deviation between the estimated 3D virtual fashion item and the ground-truth 3D virtual fashion item, the 3D virtual fashion item being generated by applying the neural network to the image depicting the real-world fashion item.

11. The method of claim 1, further comprising:
receiving input from the user that selects a subset of the 3D virtual fashion items; and
generating a listing for selling the selected subset of the 3D virtual fashion items.

12. The method of claim 1, wherein the AR experience comprises a virtual try-on experience, further comprising:
receiving a real-time image depicting a person; and
overlaying one or more of the plurality of 3D virtual fashion items on the person depicted in the real-time image.

13. The method of claim 1, further comprising:
receiving input from the user to select a subset of the plurality of 3D virtual fashion items to share with one or more friends of the user.

14. The method of claim 13, further comprising:
processing attributes of the plurality of 3D virtual fashion items to identify private 3D virtual fashion items and public 3D virtual fashion items, wherein the subset of the plurality of 3D virtual fashion items is selected from the public 3D virtual fashion items.

15. The method of claim 14, further comprising restricting sharing of the private 3D virtual fashion items to a preselected set of friends of the user.

16. The method of claim 1, further comprising:
in response to accessing the image depicting the real-world fashion item, determining that a previously generated version of the 3D virtual fashion item is not available;
in response to determining that the previously generated version of the 3D virtual fashion item is not available, requesting additional images of the real-world fashion item and applying the additional images to a machine learning model to generate the 3D virtual fashion item; and
establishing the conversation interface between the user and the group of friends.

17. The method of claim 16, further comprising:
displaying a borrow option in association with a given 3D virtual fashion item of one of the friends; and
in response to receiving input from the user that selects the borrow option, generating a message to the one of the friends requesting a corresponding physical fashion item corresponding to the given 3D virtual fashion item.

18. The method of claim 1, further comprising receiving input that selects a given 3D virtual fashion item from the virtual wardrobe to promote to other users, wherein the other users purchase the given 3D virtual fashion item by interacting with the virtual wardrobe of the user.

19. A system comprising:
at least one processor configured to perform operations comprising:
accessing, by an application, an image depicting a real-world fashion item of a user;
generating, by the application, a three-dimensional (3D) virtual fashion item based on the real-world fashion item depicted in the image;
storing the 3D virtual fashion item in a database that includes a virtual wardrobe comprising a plurality of 3D virtual fashion items associated with the user;
generating, by the application, an augmented reality (AR) experience that allows the user to interact with the virtual wardrobe, the AR experience comprising:
receiving inputs from the user and a group of friends selecting portions of their respective virtual wardrobes; and
generating, for display in a conversation interface, a group image comprising avatars representing the user and the group of friends together each respectively wearing the selected portions of the virtual wardrobes.

20. A non-transitory machine-readable storage medium that includes instructions that, when executed by one or more processors of a machine, cause the machine to perform operations comprising:
accessing, by an application, an image depicting a real-world fashion item of a user;
generating, by the application, a three-dimensional (3D) virtual fashion item based on the real-world fashion item depicted in the image;
storing the 3D virtual fashion item in a database that includes a virtual wardrobe comprising a plurality of 3D virtual fashion items associated with the user;
generating, by the application, an augmented reality (AR) experience that allows the user to interact with the virtual wardrobe, the AR experience comprising:
receiving inputs from the user and a group of friends selecting portions of their respective virtual wardrobes; and
generating, for display in a conversation interface, a group image comprising avatars representing the user and the group of friends together each respectively wearing the selected portions of the virtual wardrobes.

* * * * *